(12) United States Patent
Coutarel et al.

(10) Patent No.: US 7,716,803 B2
(45) Date of Patent: May 18, 2010

(54) METHOD FOR FABRICATING FLEXIBLE PIPE WITH ARMOR TENDONS

(75) Inventors: Alain Coutarel, Mont-Saint-Aignan (FR); Francois Dupoiron, Barentin (FR); Philippe Francois Espinasse, Bihorel (FR)

(73) Assignee: Technip France (FR)

( * ) Notice: Subject to any disclaimer, the term of this patent is extended or adjusted under 35 U.S.C. 154(b) by 533 days.

(21) Appl. No.: 11/016,480

(22) Filed: Dec. 17, 2004

(65) Prior Publication Data

US 2005/0097720 A1    May 12, 2005

Related U.S. Application Data

(62) Division of application No. 10/312,754, filed as application No. PCT/FR01/01712 on Jun. 1, 2001, now abandoned.

(30) Foreign Application Priority Data

Jun. 30, 2000    (FR)    .................................. 00 08484

(51) Int. Cl.
*B23P 19/04*    (2006.01)

(52) U.S. Cl. .............................. 29/460; 29/458; 29/462; 29/505; 138/109; 138/129; 138/130; 138/132; 138/133; 138/174; 242/419.4; 242/419.5

(58) Field of Classification Search ........... 29/458–505; 138/111–114, 148–149, 121, 122, 173; 242/419.4, 242/417, 419.5
See application file for complete search history.

(56) References Cited

U.S. PATENT DOCUMENTS

| | | | | |
|---|---|---|---|---|
| 4,508,282 A | * | 4/1985 | Eiting | 242/419.4 |
| 4,549,581 A | * | 10/1985 | Unno et al. | 138/109 |
| 4,838,317 A | * | 6/1989 | Andre et al. | 138/135 |
| 4,984,605 A | * | 1/1991 | Schippl | 138/149 |

* cited by examiner

*Primary Examiner*—Rick K Chang
(74) *Attorney, Agent, or Firm*—Ostrolenk Faber LLP

(57) ABSTRACT

A method of fabricating a flexible pipe for conveyance of fluid, comprising: winding at least one metal element in a short pitch helix around an inner sealing sheath for withstanding radial forces in the inner sealing sheath; preshaping a metal strip to form at least one ply of tensile armor tendons; winding the ply of tensile armor tendons in a long pitch helix around the at least one metal element; and applying an external protective sealing sheath around the at least one ply of tensile armor tendons.

8 Claims, 3 Drawing Sheets

METHOD FOR FABRICATING FLEXIBLE PIPE WITH ARMOR TENDONS

CROSS REFERENCE TO RELATED APPLICATIONS

This is a divisional of U.S. patent application Ser. No. 10/312,754, filed Dec. 30, 2002 in the name of Alain COUTAREL, Francois DUPOJRON, and Phillipe Francois ESPINASSE, and entitled FLEXIBLE CONDUIT WITH FLEXIBLE STRIP REINFORCEMENT. U.S. Ser. No. 10/312,754, is a 35 U.S.C. §371 national phase conversion of International Application No. PCT/FR01/01712 filed Jun. 1, 2001, which claims priority of French Application 00/08484 filed Jun. 1, 2001 the disclosures of which are hereby incorporated by reference.

BACKGROUND OF THE INVENTION

The present invention relates to a flexible pipe for transporting, over long distances, a fluid that is under pressure and possibly at a high temperature, such as a gas, petroleum, water or other fluids. The invention relates most particularly to a pipe intended for offshore oil production. It relates especially, first, to the bottom pipes, called "flow lines", that is to say flexible pipes unwound from a barge in order to be laid generally on the bottom of the sea and connected to the subsea installations, such pipes working mainly in static mode, and, second, to the rising columns, called "risers", that is to say flexible pipes connecting a surface installation such as a platform to the installations on the seabed and most of which do not lie on the seabed, such pipes working essentially in dynamic mode.

The flexible pipes used offshore must be able to withstand high internal pressures and/or external pressures and also withstand longitudinal bending, twisting or pulling without the risk of being ruptured.

They have various configurations depending on their precise use but in general they satisfy the constructional criteria defined in particular in the standards API 17 B and API 17 J drawn up by the American Petroleum Institute under the title "Recommended Practice for Flexible Pipe" and "Specification for Unbonded Flexible Pipe". Reference may also be made to documents FR 2 654 795 A, WO 98/25 063 A, FR 2 727 738 A, and FR 2 744 511 A.

A flexible pipe comprises in general, from the inside outward:

a structural assembly able to resist radial forces, composed of a sealing sheath made of a plastic, generally a polymer, able to resist to a greater or lesser extent the chemical action of the fluid to be transported, and of a winding of a metal element wound in a helix with a short pitch;

at least one ply (and generally at least two crossed plies) of tensile armor tendons wound with a long pitch, that is to say one whose lay angle measured along the longitudinal axis of the pipe is less than 60°; and an external protective sealing sheath made of a polymer.

In pipes called "smooth-bore" pipes, said structural assembly consists of:

said internal sealing sheath; and a pressure vault resistant mainly to the pressure developed by the fluid in the sealing sheath and to the external pressure and consisting of the winding of one or more interlocked profiled metal wires (which may or may not be self-interlockable) wound in a helix with a short pitch (that is to say with a winding angle of close to 90°); the profiled wires have a cross section in the form of a Z or a T or derivatives thereof (teta or zeta) or in the form of a U, or more advantageously in the form of an I (cf. document WO 00/09 899).

In a "rough-bore" pipe, there is furthermore provided, inside the internal sealing sheath, a carcass consisting of an interlocked metal strip that serves to prevent the pipe from collapsing under the external pressure being exerted on said sheath. A pressure vault may be used, too, in order also to contribute to the collapse resistance.

Hitherto, tensile armor tendons have been produced from drawn profiled wires which, for production reasons, are limited to width-to-height ratios (L/H) of less than 4, which means there is a large number (around 40) of wires in each armor ply. These wires are obtained from steel produced in a steelmaking plant by three factory conversion steps, firstly in the form of blooms, then, after rolling, in the form of coils of untreated wire, and then, after a possible heat treatment and drawing and/or rolling, in the form of coils of finished wire. Non-interlocked wires of rectangular cross section are often used for the armor tendons, but it has already been proposed, in document FR 2 664 019, to use, for the first ply of armor tendons, interlockable wires, either by themselves (self-interlockable wires) or together with a secondary interlocking wire. In document FR 2 182 372, it is recommended to produce armor plies interlocked with a Z-shaped profiled wire. Profiled wires have good mechanical properties (mechanical strength $R_m$ of around 800 to 1400 MPa) but are relatively expensive, especially when the wire is relatively wide and/or of complex shape. In addition, it becomes more difficult to use them when they are wide and thick, or when they have a relief; a prior forming operation is then generally necessary, which increases the manufacturing cost.

SUMMARY OF THE INVENTION

The objective of the invention is to propose a flexible pipe that does not have these drawbacks, while offering similar performance levels.

The invention achieves its objective by means of a flexible pipe comprising, from the inside outward: on the one hand, an impermeable structural assembly that withstands the radial forces, composed of an inner sealing sheath and at least one winding, wound in a helix with a short pitch, of one or more metal elements, and, on the other hand, at least one ply of tensile armor tendons wound with a long pitch, and an external protective sealing sheath made from a polymer, characterized in that at least one armor ply is made of a steel strip.

The term "steel strip" is understood to mean a product coming from a steelmaking plant after at least two factory conversion operations, namely the forming of a coiled sheet 16 and then the rolling by rolls 17 and slitting by a slitter 18 of said sheet in order to obtain the strip 10, that is to say a steel tape of small thickness (less than about 8 mm) which, in the unbent state, is generally characterized by a very high L/e ratio.

The strips have a lower cost than the profiled wires, for example two to four times as little depending on the complexity of the wire. They have a mechanical strength $R_m$ of around 600 to 900 MPa, generally lower than profiled wires, but they lend themselves very well to being formed (by bending or profiling), which increases their inertia and favors interlocking (self-interlocking or otherwise), as is known when they are used to form the carcass of the pipe. Moreover, the freedom in choosing the various possible ways of forming the strips makes it possible to select shapes that do not restrict flexibility substantially. Using strips in accordance with the invention makes it possible to save up to 30% of the manufacturing cost of the armor tendons.

The invention makes it possible in particular to produce interlocked armor plies and even all the interlocked armor plies, something which is not easily conceivable with interlockable or self-interlockable profiled wires for reasons of cost and difficulty of implementation. The interlocked strips are designed to leave a gap between them so as to retain the flexibility of the pipe; the interlocking of the armor tendons makes it possible to control this gap under all operating conditions and therefore to counteract phenomena leading to armor destruction, such as buckling under external pressure. In addition, owing to its width, the armor strip is more resistant to these modes of degradation.

The thickness of the strip is preferably greater than about 2 mm in order to avoid the problems of generalized corrosion. The thickness e selected for the strip and the height H of the profile formed by bending depend on the inertia of the armor tendon needed to withstand the pipe operating conditions and especially the external pressure. The width L' of the armor strip depends essentially on the flexibility of the flexible pipe to be produced; to maintain good flexibility, it is opportune to preserve at least ten, and preferably twenty, armor tendons over the periphery so as to have at least ten gaps that will confer said flexibility. It will be preferable to use an armor strip whose L'/H ratio is between 3 and 20 and preferably greater than 4. This allows the number of armor tendons in each ply to be reduced. The width L' is the width of the strip bent in order to constitute an armor tendon of the ply, as opposed to the width L which is that of the tape, L' and H being equal to L and e when the armor tendon is flat.

The tensile strength depends on the steel used, but steels are chosen to make it possible to obtain strips having high mechanical properties and sufficient elongation, in excess of 15% and preferably in excess of 25%.

Depending on the envisaged applications, it is possible to use plies of strip armor tendons in combination with at least one conventional ply of profiled wire, for example a ply of interlocked T-wire, as known from the aforementioned document FR 2 664 019.

DESCRIPTION OF PREFERRED EMBODIMENTS

From one advantageous embodiment, the strip is given a T-shaped or W-shaped profile with a central bend and interlocking flanges. The central bend may be at the bottom or the top depending on the desired inertia. The flanges allow interlocking with a reverse-wound wire of the same kind or with a flat U-shaped or C-shaped interlocking strip.

In another embodiment, the strip is in the form of a flat U with single or internally bent-over interlocking flanges.

Irrespective of the shape of the strip, it should be noted that the preforming operation, when it is necessary, is easier to perform than with a profiled wire.

BRIEF DESCRIPTION OF THE DRAWINGS

Further advantages and features will become apparent on reading the description that follows, with reference to the appended schematic drawings that show, by way of example, several embodiments of a flexible pipe according to the invention. In these drawings.

Figure 1:
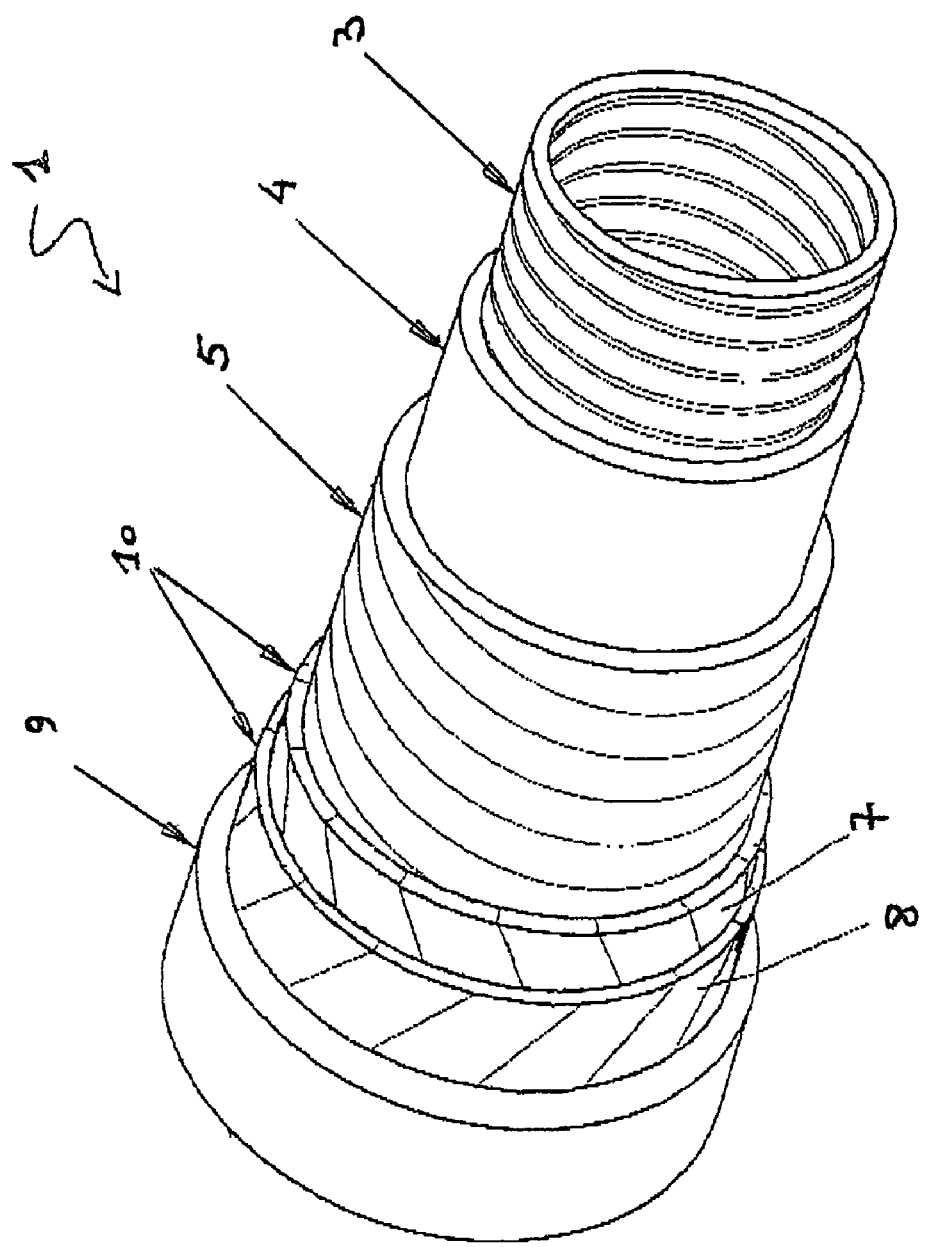
FIG. 1 is a perspective view of a pipe of the rough-bore type to which the invention applies.
Figure 1A:
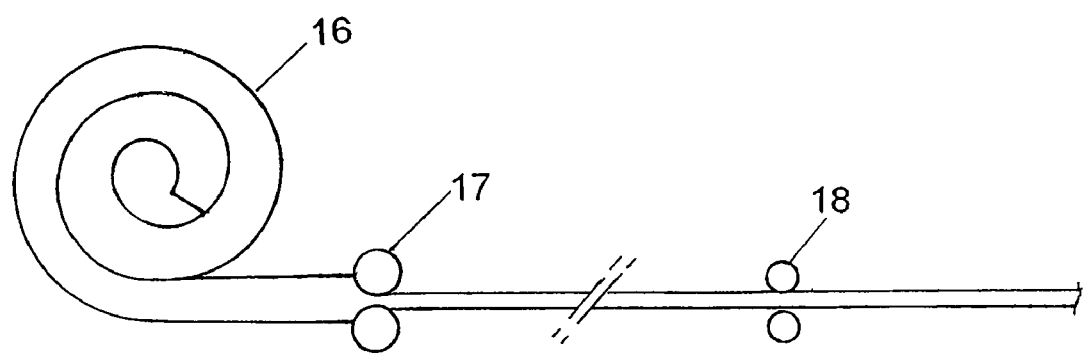
FIG. 1a shows a plan view of the process of making steel strip for the pipe.
Figure 1B:
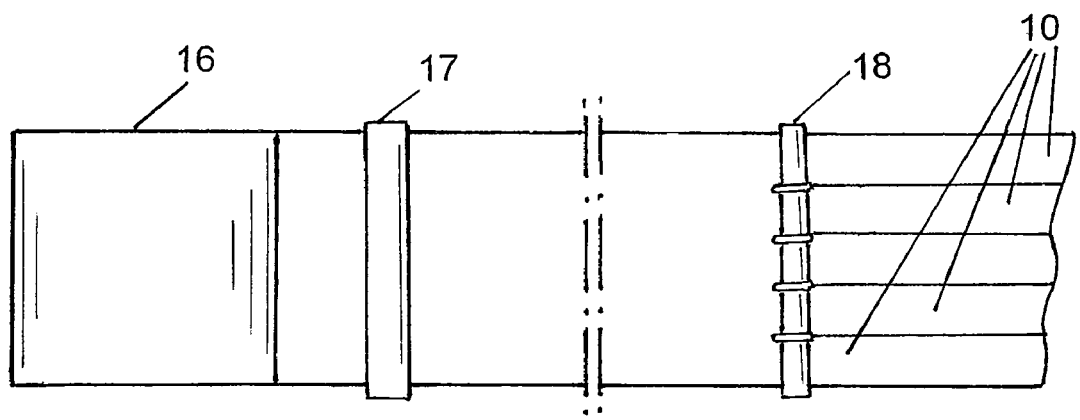
FIG. 1b shows an elevation view of the process of making steel strip for the pipe.

The pipe 1 of axis 2 comprises, from the inside outward, a carcass 3 made of an interlocked metal strip, a polymeric internal sealing sheath 4, a metal vault 5 consisting of the winding of at least one profiled metal wire (here, a self-interlockable zeta wire) wound in a helix with a short pitch, an assembly able to resist the axial tension in the longitudinal direction of the pipe and consisting of a pair of crossed armor plies 7, 8 wound in opposite directions with a long pitch, and a polymeric external sealing sheath 9. Other layers (not shown) may be provided, depending on the type and the purpose of the pipe, such as, for example, a hoop layer consisting of a winding with a short pitch of a rectangular wire on top of the pressure vault, other pairs of armor plies, and intermediate sheaths and/or tapings placed between these various layers.

According to the invention, the armor plies 7 and 8 are made of a strip 10, shown here in the form of a flat strip but more advantageously bent or preformed so as to form an interlockable strip.

FIGS. 2 to 8 illustrate various interlockable shapes of the strip 10.

Figure 2:
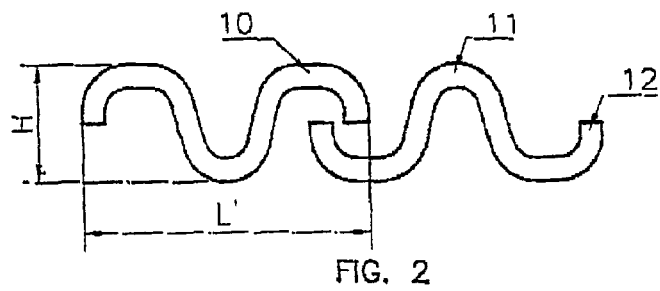
FIGS. 2 to 8 show seven variant embodiments of armor strip profiles that can be used for the pipe of FIG. 1.

In FIG. 2, the strip 10 is a flat T-shaped or W-shaped strip having a central bend 11 and two upturned flanges 12 that allow interlocking with an identical, reverse-wound strip. The height of the flanges 12 is approximately equal to or less than half the height of the bend 11.

Figure 3:
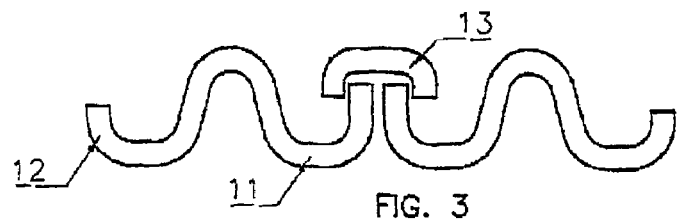
Figure 4:
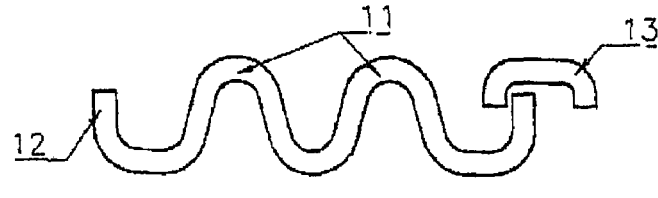

In FIG. 3, the strip 10 is also in the form of a T or W, the interlocking being achieved by a flat U-shaped fastener strip 13. The strip in FIG. 4 is similar to that in FIG. 3, with two intermediate bends 11' instead of a single central bend 11.

Figure 5:

In FIG. 5, the strip 10 is in the form of a flat U whose flanges 12 allow interlocking with an identical, reverse-wound strip, as in FIG. 1.

Figure 6:
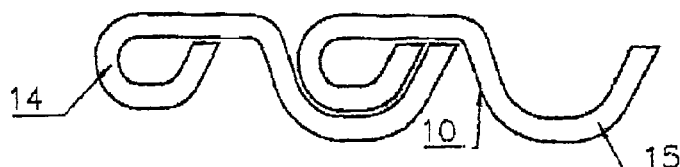

In FIG. 6, the strip 10 is S-shaped with two portions of loops 14 and 15 that can fit together, one in the other, to achieve self-locking.

Figure 7:

In FIG. 7, the armor tendon made of strip 10 is in the form of a flat C whose flanges 12' are bent over inward, so as to reduce the gap between the interlocked strips. This makes it possible to limit any creep of a polymeric sheath that might be in contact with said strips, especially when the profile is very wide.

Figure 8:
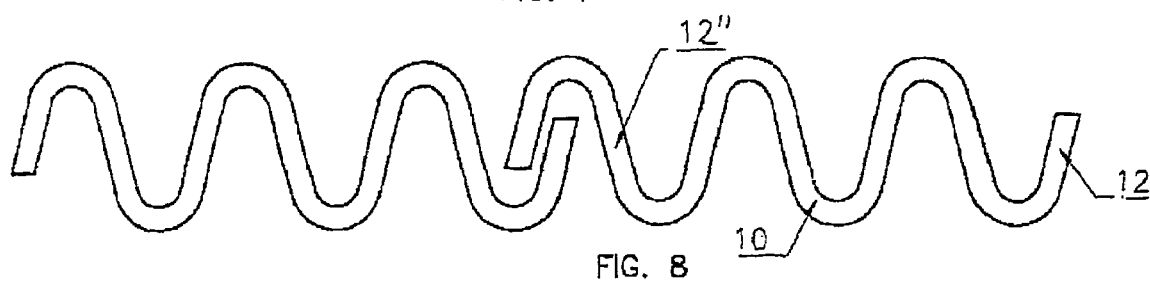

In FIG. 8, the profile 10 is corrugated and terminates in flanges 12, 12' lying in opposite directions so as to allow self-interlocking.

It should be noted that the corrugations or the gaps in the strip armor tendons may be filled, in order to limit creep of the plastic sheath in contact with the armor tendons, with a plastic filling, such as a plastic rod, with thermal insulation, if it is desired to improve the insulation, or with wire rods in order to add weight. These corrugations may also be used for transporting secondary conductors, such as an optical fiber if it is desired to transport a signal, or a power cable for supplying a subsea installation or for active heating by the Joule effect. The shapes of the corrugations will be tailored to the conductor placed in those corrugations.

The invention claimed is:

1. A method of fabricating an elongate flexible pipe, resistant to longitudinal stress, for conveyance of fluid, the method comprising the steps of:
    forming a coiled metal sheet;
    rolling the coiled metal sheet;
    slitting the rolled coiled metal sheet to form a metal strip;

winding at least one metal element in a short pitch helix, with a winding angle measured along a longitudinal axis of the pipe of close to 90°, around an inner sealing sheath for withstanding radial forces in the inner sealing sheath;

winding the metal strip in a long pitch helix, with a lay angle measured along the longitudinal axis of the pipe of less than 60°, around the at least one metal element in such a manner that the width to height ratio of the wound metal strip is between 4 and 20; and applying an external protective sealing sheath around the wound metal strip to form the flexible pipe for conveyance of the fluid.

2. The method of claim 1, wherein the metal strip is pre-shaped before winding.

3. The method of claim 2, wherein the metal strip is pre-shaped by bending or profiling.

4. The method of claim 1, wherein steps of forming the metal strip are controlled to form a flat metal strip having a thickness between 2 and 8 mm.

5. The method of claim 1, wherein the elongate flexible pipe resistant to longitudinal stress while the pipe is subsea and conveying fluid over a long distance.

6. The method of claim 1, wherein the metal strip is flat.

7. A method of fabricating an elongate flexible pipe, resistant to longitudinal stress, for conveyance of fluid, the method comprising the steps of:

forming a coiled metal sheet;

rolling the coiled metal sheet;

slitting the rolled coiled metal sheet to form a metal strip;

winding at least one metal element in a short pitch helix, with a winding angle measured along a longitudinal axis of the pipe of close to 90°, around an inner sealing sheath for withstanding radial forces in the inner sealing sheath;

winding the metal strip in a long pitch helix, with a lay angle measured along the longitudinal axis of the pipe of less than 60°, around the at least one metal element in such a manner that the width to height ratio of the wound metal strip is between 4 and 20; and applying an external protective sealing sheath around the wound metal strip to form the flexible pipe for conveyance of the fluid, wherein the metal strip is shaped by bending or profiling before winding, the shaping of the metal strip being in such a manner as to form an interlockable shape.

8. A method of fabricating an elongate flexible pipe, resistant to longitudinal stress, for conveyance of fluid, the method comprising the steps of:

forming a coiled metal sheet;

rolling the coiled metal sheet;

slitting the rolled coiled metal sheet to form a flat metal strip;

winding at least one metal element in a short pitch helix, with a winding angle measured along a longitudinal axis of the pipe of close to 90°, around an inner sealing sheath for withstanding radial forces in the inner sealing sheath;

preshaping the flat metal strip;

winding the preshaped flat metal strip in a long pitch helix, with a lay angle measured along the longitudinal axis of the pipe of less than 60°, around the at least one metal element; and applying an external protective sealing sheath around the wound metal strip to form the flexible pipe for conveyance of the fluid.

\* \* \* \* \*